United States Patent Office 3,669,649
Patented June 13, 1972

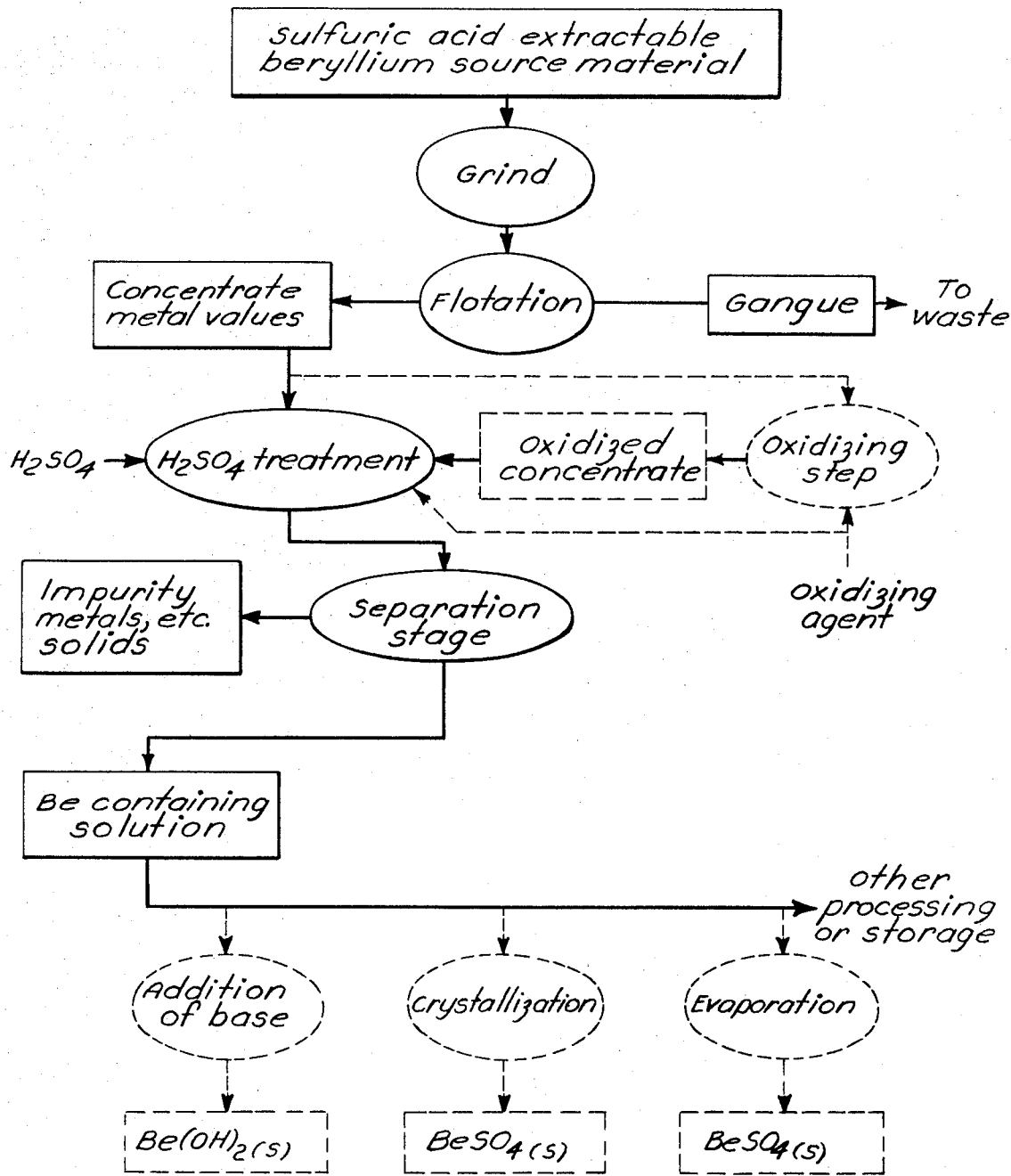

3,669,649
PROCESS FOR RECOVERY OF BERYLLIUM
Robert S. Olson and Joseph P. Surls, Jr., Walnut Creek, Calif., assignors to The Dow Chemical Company, Midland, Mich.
Continuation-in-part of application Ser. No. 514,179, Dec. 16, 1965. This application Jan. 30, 1970, Ser. No. 7,130
Int. Cl. C22b *59/00*
U.S. Cl. 75—101                               7 Claims

ABSTRACT OF THE DISCLOSURE

Beryllium values are separated from other metal values such as ferric iron, aluminum, thorium and rare earth values, by a process comprising heating an aqueous slurry wherein the beryllium values are present initially as solids at a temperature of at least 145° C., for at least 20 minutes. Final hydrogen ion concentration at the end of the heating period is controlled within the range of from about 2 to about 0.0001 normal. After the heating step, solubilized beryllium values are separated from solid residual metal values and other impurities by filtration or other conventional liquid-solid separatory techniques.

BACKGROUND OF THE INVENTION

The present application is a continuation-in-part of U.S. Patent 3,511,597, filed Dec. 16, 1965.

It is known that beryllium values can be leached from ores and other source materials with an excess of concentrated mineral acid. However, such highly acidic leaching conditions solubilize large quantities of impurities (such as iron and aluminum) along with the beryllium. Morana et al. (U.S. 3,116,111) obtained separation of beryllium values from such highly acidic leach liquors by a series of steps involving dilution with water, filtration, and successively adjusting pH to various levels and filtering to achieve selective precipitation and separation of the impurities.

The problem of mass solubilization of impurities has been reduced by employing only moderately concentrated mineral acid solutions (for example, see Grunig et al. U.S. 3,395,975). However, a series of operations is still required to obtain relatively pure solutions of beryllium values. For example, by the method of Grunig et al., one must still (1) leach the Be values from the ore (2) filter to separate the leach liquor from ore residue (3) adjust the pH of the leach liquor to from 1.5 to 4, and (4) heat at elevated pressure. Finally, the reaction mixture must be filtered a second time to remove precipitated impurities.

It is an object of the present invention to provide a simplified process generally comprising only two unit operations whereby relatively pure aqueous solutions of beryllium values are obtained. A further object of the invention is to avoid separate process steps for digesting the ore and pH adjustment. More specifically, an object of the invention is to simultaneously leach beryllium values from the ore while treating the ore to avoid solubilizing appreciable quantities of impurity metal values into the leach liquor.

The present invention is based upon the discovery that if the initial acid leaching of the beryllium ore or other solid beryllium source material is carried out under controlled conditions of heat and pressure, with the hydrogen ion concentration at the end of the heating period being from about 2 to about 0.0001 normal, the resulting leach liquor is a relatively pure solution of beryllium values.

The figure of the drawing is a schematic flow diagram of one embodiment of the novel process of the present invention.

DESCRIPTION OF THE INVENTION

The present invention comprises heating at a predetermined temperature range, an aqueous slurry containing beryllium and other metal values for a period of time under controlled conditions of acidity such that hydrogen ion concentration ($H^+$) at the end of the heating period does not exceed about 2 normal and is more than about 0.0001 normal. The reaction conditions, i.e., temperature, pressure and time as delineated hereinafter are maintained to assure solubilization of the beryllium values and substantially complete hydrolysis of hydrolyzable salts or rejection of oxides and the like materials which tend to form such salts, such as, for example, iron, aluminum, thorium and rare earth metals, with or without simultaneous oxidation.

By the practice of the present novel process, metal impurities, such as those set forth directly hereinbefore, either remain undissolved or precipitate in the reaction mixture as hydrolysis products. The beryllium values are dissolved in the acidic reaction mass and are separated from the precipitated solids. Solid beryllium values, in high purity, can be recovered from the so-separated solution by evaporation of the liquid phase, crystallization, precipitation, or other recovery procedures.

The term "aqueous acid reaction mixture" as used herein encompasses mainly slurries of a beryllium ore or beryllium ore concentrate with an aqueous mineral acid. Acidic reaction mixtures also include an aqueous slurry of a beryllium ore or beryllium ore concentrate having an acid forming anhydride (e.g., $SO_2$+oxygen) dissolved therein.

Ordinarily, in carrying out the instant process, a finely divided particulate solid beryllium ore or beryllium ore concentrate is heated in the presence of an aqueous mineral acid at a temperature of at least about 145° C., for a minimum of about 20 minutes while controlling the hydrogen ion normality such that the hydrogen ion concentration after the heating period is from about 1.0 normal to about 0.0001 normal and preferably is from about 1.0 normal to about 0.2 normal.

In a preferred embodiment of the invention to assure maximum separation of beryllium from other metals, a beryllium ore or an ore concentrate is heated with hydrochloric acid, nitric acid, sulfuric acid or in the presence of water, sulfur dioxide and an oxidizer such as air for example, at a temperature of from about 175° C., to about 250° C., for a period of time of from about 20 minutes to about 24 hours while maintaining the final hydrogen ion normality at the end of the heating step at about 0.2 to about 0.5.

Ordinarily the heating step is carried out in a closed reactor at autogeneous pressure although pressure in excess of that generated during the reaction can be employed if desired.

In the actual performance of the present novel process, hydrogen ions are formed as one product of the hydrolysis of certain metal salt impurities. To achieve the maximum separation of beryllium from other insoluble impurities and hydrolyzable metal values, as listed hereinbefore, which ordinarily are present in beryllium ores, and concentrates, a maximum hydrogen ion normality of about 2 is maintained in the reaction mass. Usually the hydrogen ion concentration is maintained at a normality below 1.0 and preferably is maintained at a normality of from about 0.2 to about 0.5. To assure the maintenance of the requisite hydrogen ion normality for a given beryllium source material, the actual quantity of mineral acid to be employed or the initial hydrogen ion concentration of an acid head solution from conventional ore opening can be determined and/or adjusted to account for the concentration of hydrolyzable impurity metal values present in the initial reaction mass, i.e., the amount of acid present at the beginning of the heating step is sufficient to assure that the hydrogen ion concentration at the end of the heating step will fall within the above described ranges. If an excess of hydrogen ion originally is present, or is produced during the processes, addition of base can be used to obtain the requisite normality at the end of the heating period. By maintaining the reaction conditions within the ranges set forth hereinbefore, the maximum separation of beryllium from other metals normally associated therewith in ores, concentrates and the like, is achieved.

If a less pure beryllium product is desired, i.e., less complete separation of beryllium from insoluble or hydrolyzable metal values usually associated therewith, the reaction can be run at a higher hydrogen ion normality or can be terminated before the hydrolysis of the hydrolyzable metal salts is complete and/or the beryllium is substantially solubilized.

If iron is present as Fe(II), i.e., a valence of 2, preferably the present process is carried out in the presence of an oxidizing agent such as air, oxygen, hydrogen peroxide, metal peroxides, inorganic oxidizing salts such as alkali metal perchlorates, -permanganates, -chlorates, -periodates, -hypochlorites, persulfates and the like, oxidizing mineral acids, etc., to promote oxidation of the Fe(II) to the Fe(III) state. This oxidation step is requisite in the preparation of a high purity product since ferrous oxide is soluble in the acidic reaction medium both at high and low temperatures. At the operating temperatures of the present process, iron in the Fe(III) form is separated substantially quantitatively as anhydrous ferric oxide ($Fe_2O_3$) or, under some conditions, as a basic ferric sulfate if sulfuric acid is employed in the process.

Conveniently the oxidation of the Fe(II) values can be carried out during operation of the present process by introducing or incorporating the oxidizing agent into the acid reaction mass before or during the actual processing. For example, air can be bubbled through the reaction mixture during the heating step or quantities of oxidizing agent sufficient to oxidize the iron can be incorporated into the reaction mixture. Alternatively, any iron values in the two (ferrous) valence state which might be present in the acid solution or accessible to oxidation in the beryllium containing solid can be oxidized to the ferric state prior to heating above 145° C.

With peroxides, oxidizing acids and oxidizing salts, ordinarily these are employed in about a stoichiometrically equivalent amount as required for oxidation of the iron (II) values present. An amount in excess of this quantity can be employed, taking into account the effect of excess acid, i.e., hydrogen ion normality, on the separation of the metal values as set forth hereinbefore. With air or oxygen as the oxidizer, it is essential only that the treatment be continued until substantially all of the Fe(II) values are oxidized. Continued addition of the gases in excess of that required, however, is not detrimental.

Operability of one embodiment of the present novel process with a sulfuric acid extractable beryllium source material, such as an ore or an ore concentrate is shown in the schematic flow diagram of the drawing.

In the practice of this embodiment, the ore ordinarily first is ground and subjected to conventional flotation and classification techniques to concentrate the beryllium values and remove the gangue. Analysis of a typical beryllium ore concentrate, expressed as metal equivalent, is Be 0.3–0.4%, Fe 10–15%, rare earth oxides about 0.3%, Al about 5% and Th about 0.2%. (Concentration of the ore is not necessary for successful operation of the present process as any beryllium ore or source material from which beryllium values can be extracted with the mineral acid can be used.) The resulting concentrate is heated with sulfuric acid in accordance with the presently disclosed process conditions whereupon beryllium is solubilized and remains in solution, the other metal values being rendered substantially insoluble.

The resulting beryllium product solution readily is separated from the solid residue by filtration, centrifugation and the like liquid-solid separatory procedures known to one skilled in the art.

The beryllium product solution can be processed in a number of ways to recover the beryllium values present therein. To illustrate, beryllium sulfate in high purity, i.e., having very low concentrations of other cations and anions associated therewith can be produced directly by crystallization from and/or evaporation of the solvent; beryllium hydroxide can be precipitated from the product solution by treating the liquid mass with base, e.g., caustic soda (NaOH); beryllium carbonate can be precipitated by adding a basic carbonate, for example, sodium carbonate, to the product solution.

The recovered products can be further treated or reacted with appropriate reagents or reactants to produce beryllium oxide or beryllium salts, e.g., beryllium halides, which can serve as source materials for production of beryllium metals or other useful products.

It is to be understood that the resulting high purity beryllium sulfate product solution itself can be utilized as a reactant in subsequent processes or as a direct source of high purity beryllium sulfate.

Alternatively, as shown in the drawing, the ore concentrate can be subjected to an oxidizing treatment during the sulfuric acid treatment stage or can be separately treated with an oxidizing agent prior to the acid treatment.

The present process can be carried out in batch-type, cyclic batch or continuous operations employing acidulating techniques and reaction vessels, liquid and solids handling, transporting and processing equipment and techniques generally employed in the art.

The processing apparatus, material handling and transport equipment, storage vessels and allied equipment are to be constructed from those materials and of a design such that they possess the requisite strength and structural characteristics required for operability of the process. Also, this equipment must not be detrimentally attacked by the reactants employed or products produced.

The following examples serve further to illustrate the present invention.

Example 1

A Seal Lake ore concentrate assaying about 0.37 weight percent beryllium, Fe~12%, Th~0.2%, Al~5%, rare earth oxides~.3% and $PO_4^\equiv$ 1.6% and having a nominal particle size of about minus 200 mesh U.S. Standard Sieve was provided. About 15 grams of the ore was placed into a glass ampoule along with about 30 cubic centimeters of 2.03 N sulfuric acid (equivalent to 400 lbs. $H_2SO_4$/ton Be concentrate) and sufficient potassium perchlorate to oxidize all the iron in the ore sample, assuming that riebeckite was the iron containing material in the ore and that all iron present was Fe(II). The ampoule then was sealed.

The ampoule was fitted with a thermocouple and placed in a pressure resistant tube furnace maintained at a temperature of about 230° C. The reaction mixture was heated to furnace temperature and held at this temperature for about one hour, the autogeneous reaction pressure being about 470 p.s.i.g. Following the reaction period, the furnace was cooled and the ampoule was removed therefrom.

The reaction mixture was leached with water to remove solubilized materials therefrom.

Analysis of the resulting filtrate indicated the following composition expressed as gram/liter. (For purposes of clarification, the analytical results have been "normalized" to a basis of 1 g./liter beryllium.) Be—1.0; Al—0.03; Fe—0.015; Th—0.005; $PO_4^\equiv$—0.08; rare earth oxides—0.36. The $H^+$ normality at the end of the heating period was 0.5. The amount of beryllium solubilized and recovered was about 95% of that present in the concentrate.

This study was repeated using the same procedure and reaction conditions except that the oxidizing agent was not incorporated into the reaction mixture. Beryllium recovery again was about 95 percent. Analysis of the product filtrate "normalized" to the basis of 1 g./liter beryllium showed Be—1.0; Al—0.03; Fe—3.4; Th—0.02; $PO_4^\equiv$—2.0; rare earth oxides—1.7. The $H^+$ normality was 0.9.

Example 2

Using the same technique, procedure and same ore concentrate (Be—0.37%) as set forth in Example 1, a number of tests were run to determine reaction times required for solubilizing the beryllium contained in the concentrate. In all of these runs the reaction temperature was about 230° C. and a pressure of about 470 p.s.i.g. and sulfuric acid of 4 to 6 normal was utilized. The initial amount of acid was about 400 pounds/ton of concentrate.

The results of these studies are presented in Table I which follows.

TABLE I

| Run number | Reaction time (minutes) | Final [H+] (N) | Beryllium solubilized (percent) |
|---|---|---|---|
| 1 | 10 | 1.7 | 78 |
| 2 | 20 | 1.4 | 90 |
| 3 | 20 | 2.1 | ¹84 |
| 4 | 30 | 0.9 | 95 |
| 5 | 240 | 0.9 | 95 |

¹ Minus 65 mesh concentrate.

Example 3

A number of runs were made evaluating the effect of temperature on the rate of solubilization of beryllium from the ore concentrate described in Example 1. In these studies, minus 200 mesh ore was placed with sulfuric acid (1 to 6 normal) in a glass vessel which was tightly closed. The vessel was placed in a water bath maintained at a predetermined temperature for a preselected length of time. Following the test period, the product mixture was removed from the test assembly and the amount of solubilized beryllium determined.

Table II summarizes the results of this study and shows the reaction time at predetermined temperatures required to obtain a minimum of 90 percent solubilization of the beryllium in the concentrate.

TABLE II

| Run number | Reaction temp. (° C.) | Reaction time (hours) | Final [H+] (N) |
|---|---|---|---|
| 1 | 100 | 24 | 1.2 |
| 2 | 150 | 3 | ~1.3 |
| 3 | 230 | 0.3 | 1.4 |

Example 4

The effect of sulfuric acid to beryllium oxide ratio on solubilization of beryllium was evaluated using minus 200 mesh Seal Lake Concentrate of a composition similar to described in Example 1 and 1 to 6 N sulfuric acid following the procedures and techniques described in Example 1. The runs were made at 230° C. and at a pressure of about 470 p.s.i.g. The results of these studies are presented in Table III.

TABLE III

| Run No. | H₂SO₄/beryllium concentrate¹ | H₂SO₄/BeO molar ratio | Beryllium solubilized (percent) | [H+] (g./l.) |
|---|---|---|---|---|
| 1 | 100 | 1.25 | 10 | 10⁻⁴ |
| 2 | 200 | 2.50 | 38 | 10⁻⁴ |
| 3 | 300 | 3.75 | 85 | 0.5 |
| 4 | 400 | 5.00 | 95 | 0.9 |
| 5 | 600 | 7.50 | 95 | 2.5 |

¹ Expressed as H₂SO₄ lbs./ton concentrate.

Example 5

Using the same general technique, procedure and ore composition described in Example 1, a minus 200 mesh U.S. Standard Sieve flotation concentrate of beryllium ore containing about 0.4 weight percent beryllium and iron (II), aluminum, thorium and rare earth metals as the impurities was leached in the absence of an oxidant at about 95° C. with 4 N sulfuric acid at an equivalent H₂SO₄/beryllium concentrate relationship of about 400 lbs. acid/ton concentrate. Analysis of the resulting leachate, normalized to 1 gram/liter of beryllium showed Al—0.15 g./l., Fe—2.9 g./l., rare earths—2.5 g./l. and Th—0.065 g./l. The hydrogen ion normality of the product solution was 0.5. Repeating this run at about 230° C. provides a product solution of substantially lower aluminum, thorium and rare earth content but of somewhat higher iron content.

A fresh mixture of concentrate and sulfuric acid in the same concentrations as set forth directly hereinbefore was prepared except that it contained additionally an alkali metal chlorate as an oxidant in quantity sufficient to assure substantially complete oxidation of all the iron (II) to iron (III). This mixture was heated at about 230° C. in the leaching operation. Analysis of the resulting leachate, normalized to 1 gram/liter of beryllium showed Al—0.03 g./l., Fe—0.015 g./l., rare earths 0.36 g./l., Th—0.005 g./l. This product solution also had a hydrogen ion normality of 0.5.

This study emphasizes the fact that if beryllium of high purity is desired with respect to iron impurity it is essential that iron (II) values be oxidized to iron (III) values before or during leaching in accordance with the disclosed novel process.

Example 6

About 20 cubic centimeters of 3 N hydrochloric acid, about 50 grams of a minus 200 mesh Seal Lake ore by a composition similar to that described in Example 1 (Be~0.42%) and about 1.9 grams of potassium chlorate (KClO₃) were mixed and treated in accordance with the general procedure described in Example 1. The ore, oxidant and acid mixture was heated at a temperature of about 95° C. for about 24 hours. Following this period, the resulting slurry was filtered and washed with about 15 cubic centimeters of water. Analysis of the resulting filtrate product solution, normalized to 1 gram/liter beryllium, gave Fe—2.62 g./l., Al—0.23 g./l., $PO_4^\equiv$—0.9 g./l and rare earth oxides 1.3 g./l. (The thorium content of this solution was not determined.)

The filtrate product from the above leaching operation was heated at about 150° C. for about 3 hours after which time it was filtered and the product solution again analyzed. This filtrate, normalized to 1.0 g./l. beryllium analyzed Fe—0.16 g./l., $PO_4^\equiv$—0.058 g./l., Th—0.052 g./l., Al—0.19 g./l and rare earth oxides 0.1 g./l.

Example 7

About 5 grams of Seal Lake ore concentrate of a composition similar to that described in Example 1 (0.35% Be) and 5 cubic centimeters of 4.0 molar nitric acid were reacted at 250° C. for 3 hours using the same general processing techniques set forth in Example 1. The resultant product solution was separated from the residual solids by filtration. The solids were washed and the washings added to the product solution. Analysis of the product solution, normalized to 1 g./l. beryllium, indicated Fe—0.034 g./l., $PO_4^\equiv$—0.048 g./l., rare earths—0.1 g./l. and Al—0.064 g./l. The hydrogen ion normality was about 0.5.

In this embodiment, the nitric acid not only serves as the acidulating agent but also acts as oxidant as well.

Example 8

A beryllium concentrate of a composition similar to that described in Example 1 containing about 0.4 Be after slurrying in water is heated to a temperature of from about 145 to about 230° C. for at least about 20 minutes during which time the slurry is treated with sulfuric acid produced in situ by bubbling a stream of air and $SO_2$ into the heated slurry. Separation of the resulting solution from the residual solids provides a product solution containing substantially all of the beryllium values originally present in the concentrate with little or no contamination from other impurity metals which also were present therein.

What is claimed is:

1. A process for separating beryllium values from other values which comprises;
   (a) providing an aqueous acidic slurry containing solid beryllium values and at least one solid metal value selected from the group consisting of ferric iron, aluminum, thorium and rare earths; and a mineral acid or a mineral acid forming anhydride,
   (b) heating the slurry in a closed reactor at least at autogenous pressure at a temperature of at least about 145° C. for a minimum period of about 20 minutes, while providing a final hydrogen ion concentration of from about 2 to about 0.0001 normal thereby preferentially solubilizing the beryllium values, and
   (c) separating the solubilized beryllium values from solid residual metal values remaining after the heating period.

2. The process as defined in claim 1 and including the step of heating said aqueous acidic reaction mixture at a temperature of from about 175° C. to about 250° C., in a sealed reactor under autogeneous pressure for a period of from about 20 minutes to about 24 hours.

3. The process as defined in claim 2 and including the step of admixing a beryllium ore or beryllium ore concentrate and sulfuric acid to provide said aqueous acidic slurry and controlling the final hydrogen ion normality after heating within the range from about 0.2 to about 1.

4. The process as defined in claim 1 wherein a beryllium ore or beryllium ore concentrate is admixed with an aqueous mineral acid to provide the slurry.

5. The process as defined in claim 4 wherein the mineral acid is hydrochloric acid, nitric acid or sulfuric acid.

6. A process as in claim 1 wherein the hydrogen ion concentration at the end of the heating step is from about 2 to about 0.5 normal.

7. The process as defined in claim 1 wherein the ferric iron is oxidized from ferrous iron.

References Cited
UNITED STATES PATENTS

| | | | |
|---|---|---|---|
| 3,177,068 | 4/1965 | Mod et al. | 75—101 |
| 3,511,597 | 5/1970 | Olson et al. | 23—19 R |
| 3,116,111 | 12/1963 | Morana et al. | 23—183 |
| 3,395,975 | 8/1968 | Grunig et al. | 23—87 RX |
| 3,145,081 | 8/1964 | Surls et al. | 23—183 |
| 3,369,860 | 2/1968 | Surls | 23—18 |

OTHER REFERENCES

Dana, A Textbook of Mineralogy, John Wiley and Sons, Inc., New York, 1932, pp. 577 and 578.

L. DEWAYNE RUTLEDGE, Primary Examiner

G. T. OZAKI, Assistant Examiner

U.S. Cl. X.R.

75—114, 115, 121; 23—19, 24 B, 87, 102

PO-1050
(5/69)

UNITED STATES PATENT OFFICE
CERTIFICATE OF CORRECTION

Patent No. 3,669,649　　　　　　Dated 13 June 1972

Inventor(s)　　Robert S. Olson and Joseph P. Surls, Jr.

It is certified that error appears in the above-identified patent and that said Letters Patent are hereby corrected as shown below:

Column 6, line 13, change "2.5" to --2.4--.

line 74, add --%.-- after "0.4".

Column 8, line 11, delete "2" and insert --0.5--.

line 11, delete "0.5" and insert --0.2--.

Signed and sealed this 17th day of October 1972.

(SEAL)
Attest:

EDWARD M. FLETCHER, JR.　　　　　　　　ROBERT GOTTSCHALK
Attesting Officer　　　　　　　　　　　Commissioner of Patents